(12) United States Patent
Shigemoto et al.

(10) Patent No.: US 6,181,323 B1
(45) Date of Patent: Jan. 30, 2001

(54) MULTIDIRECTIONAL CONTROLLER AND MULTIDIRECTIONAL CONTROLLING DEVICE USING THE SAME

(75) Inventors: Hideki Shigemoto, Osaka; Hiroshi Matsui, Hirakata; Yukihiro Ishihara, Kaizuka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/010,937

(22) Filed: Jan. 22, 1998

(30) Foreign Application Priority Data

Jan. 24, 1997 (JP) .................................................. 9-010868
Oct. 13, 1997 (JP) .................................................. 9-278369

(51) Int. Cl.⁷ .................................................. G09G 5/00
(52) U.S. Cl. ........................ 345/156; 345/159; 345/157
(58) Field of Search .................... 345/156, 161, 345/154, 159, 157

(56) References Cited

U.S. PATENT DOCUMENTS

| 4,794,388 | * 12/1988 | Matthews | 345/184 |
| 4,951,036 | * 8/1990 | Grueter | 345/184 |
| 5,408,621 | 4/1995 | Ben-Arie | 395/375 |
| 5,423,227 | 6/1995 | Polaert et al. | 73/862 |
| 5,563,630 | 10/1996 | Tsakiris et al. | 345/160 |
| 5,859,631 | * 1/1999 | Bergman | 345/156 |

FOREIGN PATENT DOCUMENTS

| 540 094 | 5/1993 | (EP) . |
| 702 385 | 3/1996 | (EP) . |

* cited by examiner

Primary Examiner—Richard Hjerpe
Assistant Examiner—Ali Zamani
(74) Attorney, Agent, or Firm—Ratner & Prestia

(57) ABSTRACT

A multidirectional controller includes: a substrate having a first end portion and a second end portion, which sways via a supporting point provided at the first end portion; an electronic part provided at the second end portion, which includes a control portion which is manipulated in a predetermined direction in which the electronic part causes the substrate to sway when the electronic part is manipulated; a supporting member for supporting the substrate; and a switch provided so as to be switched in response to the sway of the substrate, when the electronic part is manipulated in the predetermined direction.

22 Claims, 17 Drawing Sheets

600

MULTIDIRECTIONAL CONTROLLER AND MULTIDIRECTIONAL CONTROLLING DEVICE USING THE SAME

BACKGROUND OF THE INVENTION

1. Field of the Invention

The present invention relates to a multidirectional controller and a multidirectional controlling device using the multidirectional controller. Specifically, the present invention relates to a multidirectional controller which is manipulated in horizontal (circumferential) and vertical directions with respect to a surface of a main substrate of the controller. The multidirectional controlling device is used, for example, as a controlling device for a portable electronic apparatus, a pointing device for a personal computer or a remote controller for various electronic apparatuses.

2. Description of the Related Art

Conventionally, a controlling device for a portable electronic apparatus or the like includes a controller which is manipulated in a direction horizontal to a surface of a main substrate of the controller. Hereinafter, a conventional controller will be described.

In a conventional controller, a rotational electronic part with a control knob is soldered to one end of a main substrate. Electric signals output from the rotational electronic part are led to a connecting terminal via a line pattern provided on the main substrate. The electric signals are then transmitted through a flexible substrate connected to the connecting terminal, and to a circuit of an apparatus including the controller.

However, such a conventional controller is controlled only in directions horizontal to the main substrate of the apparatus.

SUMMARY OF THE INVENTION

According to one aspect of the present invention, a multidirectional controller includes: a substrate having a first end portion and a second end portion, which sways via a supporting point provided at the first end portion; an electronic part provided at the second end portion, which includes a control portion which is manipulated in a predetermined direction in which the electronic part causes the substrate to sway when the electronic part is manipulated; a supporting member for supporting the substrate; and a switch provided so as to be switched in response to the sway of the substrate, when the electronic part is manipulated in the predetermined direction.

In one embodiment of the present invention, the substrate has a thin portion which functions as the supporting point.

In another embodiment of the present invention, the substrate and the supporting member are integrally formed by a resin molding.

In still another embodiment of the present invention, the substrate includes a top surface and a bottom surface and the switch is provided on at least one of the surfaces of the substrate; the supporting member includes opposing supporting portions which are provided so as to sandwich the surfaces of the substrate therebetween; and at least one of the opposing supporting portions has a pressing portion for pressing the switch in response to the sway of the substrate in a direction toward at least one of the surfaces of the substrate.

In still yet another embodiment of the present invention, the substrate includes an insulative flexible substrate portion and the flexible substrate portion is provided with a line pattern. The flexible substrate portion is adhered to at least one of the surfaces of the substrate.

In still another embodiment of the present invention, the line pattern includes an electric signal lead portion for leading electric signals from the electronic part and outputting electric signals from the switch to elements which are outside of the multidirectional controller; and the electric signal lead portion is provided at a position extending in sideways from the top surface or bottom surface of the substrate.

In still another embodiment of the present invention, the electronic part and the switch are provided on the line pattern.

In still another embodiment of the present invention, the control portion has a movable contact portion which makes contact with a first securing contact portion which is provided on the flexible substrate; and the switch includes a movable dome-like contact portion made from an deformable metal thin plate on a second securing contact portion which is provided on the flexible substrate portion.

In still another embodiment of the present invention, the substrate includes a pressing portion for pressing the switch; and the pressing portion is on at least one of the surfaces of the substrate.

In still another embodiment of the present invention, a multidirectional controller further includes a joint between the substrate and the supporting member. At least a part of the joint functions as the supporting point.

In still another embodiment of the present invention, the supporting member has an opening for inserting the substrate into the supporting member. A portion where the opening and the substrate make contact with each other functions as the supporting point.

In still another embodiment of the present invention, the substrate includes a sway shaft and the supporting member supports the substrate such that the substrate is swayable substantially about the sway shaft.

In still another embodiment of the present invention, the switch is provided on at least one of a position lower than the top surface of the substrate and a position higher than the bottom surface of the substrate; the substrate includes a pressing portion for pressing the switch; and the pressing portion is provided at a different level from a level of the substrate and is provided at a position extending sideways from the substrate.

In still another embodiment of the present invention, the substrate is an insulative substrate and the substrate includes a line pattern.

In still another embodiment of the present invention, a first securing contact portion is formed on the line pattern; the supporting member includes an elastic contact portion which deformably makes contact with the first securing contact portion; and the elastic contact portion transmits electric signals from the electronic part and electric signals from the switch to elements which are outside of the multidirectional controller.

In still another embodiment of the present invention, the switch includes a movable dome-like contact portion which is made from an deformable metal thin plate; a second securing contact portion is formed on the line pattern; and the movable dome-like contact portion is on the second securing contact portion.

In still another embodiment of the present invention, the electronic part includes a rotation-type or a sliding-type encoder.

In still another embodiment of the present invention, the electronic part includes a rotation-type or a sliding-type switch.

In still another embodiment of the present invention, the electronic part includes a click adjustment at a predetermined position.

In still another embodiment of the present invention, the control portion further includes a switch which is switched when the control portion is pressed toward the supporting point.

According to another aspect of the present invention, the present invention is a multidirectional controlling device including a multidirectional controller. The multidirectional controller includes: a substrate having a first end portion and a second end portion, which sways via a supporting point provided at the first end portion; an electronic part provided at the second end portion, which includes a control portion which is manipulated in a predetermined direction. The electronic part causes the substrate to sway when the electronic part is manipulated; a supporting member for supporting the substrate; and a switch provided so as to be switched in response to the sway of the substrate, when the electronic part is manipulated in the predetermined direction. The multidirectional controller is mounted in a main body of the multidirectional controlling device such that a part of the control portion projects out from the main body.

In one embodiment of the present invention, a predetermined operation is executed or halted by manipulating the control portion in a predetermined direction.

Thus, the invention described herein makes possible the advantages of providing (1) a multidirectional controller which may be manipulated in both horizontal and vertical directions, and a multidirectional controlling device using the multidirectional controller; (2) a multidirectional controller which has a satisfactory click feeling when it is manipulated in vertical directions, and a multidirectional controlling device using the multidirectional controller; (3) a multidirectional controller which may be manipulated in vertical directions with a small manipulation stroke and thus is stable, and a multidirectional controlling device using the multidirectional controller; and (4) a multidirectional controller which is durable against numerous manipulations in the vertical directions, and a multidirectional controlling device using the multidirectional controller.

These and other advantages of the present invention will become apparent to those skilled in the art upon reading and understanding the following detailed description with reference to the accompanying figures.

DESCRIPTION OF THE PREFERRED EMBODIMENTS

Figure 1:
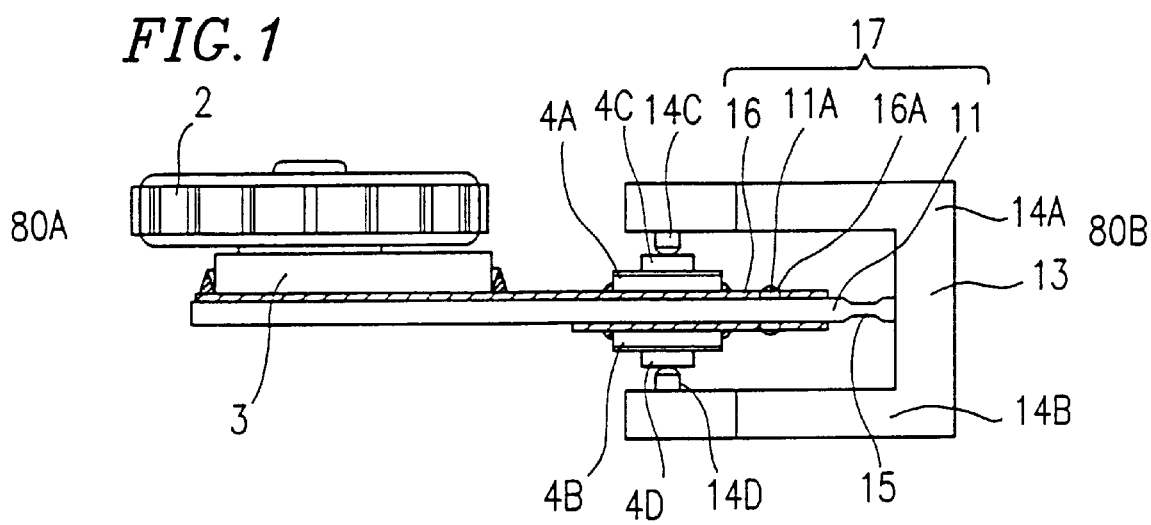
FIG. 1 is a cross-sectional view showing a multidirectional controller according to a first example of the present invention.

Hereinafter, the present invention will be described by way of illustrative examples with reference to the accompanying drawings. The same reference numerals designate the same components.

Figure 17:
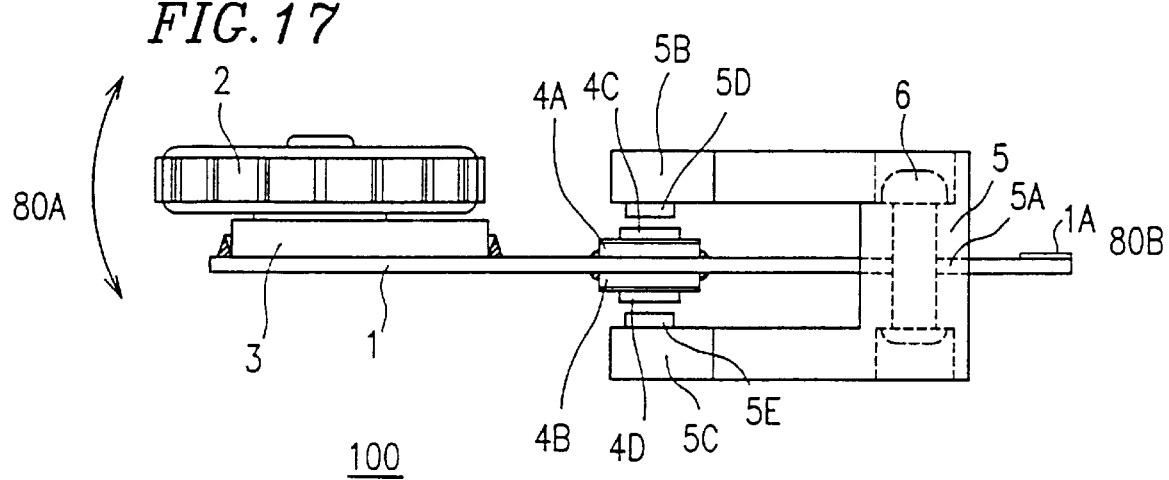
FIG. 17 is a cross-sectional view of a multidirectional controller according to the present invention.
Figure 18:
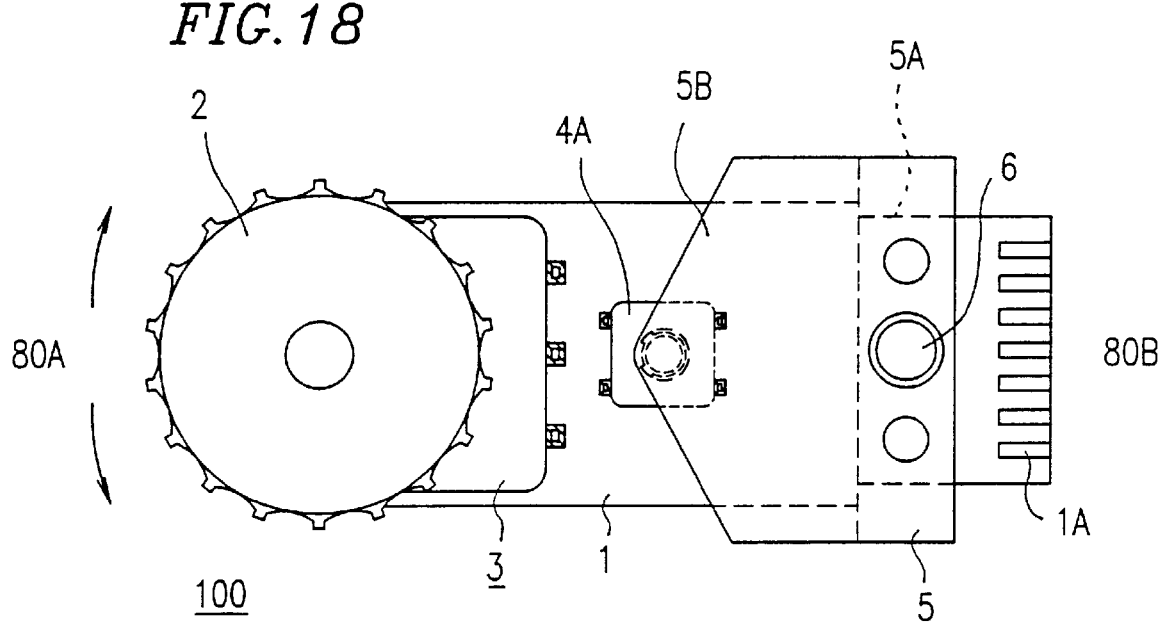
FIG. 18 is a plan view of the multidirectional controller according to the present invention shown in FIG. 17.

FIG. 17 is a cross-sectional view of a multidirectional controller 100 according to the present invention. FIG. 18 is a plan view of the multidirectional controller 100.

Referring to FIGS. 17 and 18, a main substrate 1 is formed of a thin elastic insulative substrate such as, for example, a resin substrate which is provided with line patterns made of metal foils on both surfaces thereof. A rotational electronic part 3 with a control knob 2 is soldered to a front end 80A portion (a left end portion in the figures) of the main substrate 1. Pushing-type switches 4A and 4B are soldered at the middle of the top and the bottom surfaces of the main substrate 1, respectively.

A rear end 80B portion (a right end portion of the figures) of the main substrate 1 is pressed through a hole 5A of a supporting member 5, and thereby fixed with a screw 6. Opposing supporting portions 5B and 5C extend from the supporting member 5 toward the front end 80A of the main substrate 1 along the surfaces of the main substrate 1. Bumps 5D and 5E project from the supporting portions 5B and 5C toward switching buttons 4C and 4D on the pushing-type switches 4A and 4B, respectively.

Electric signals output from the rotational electronic part 3 and the pushing-type switches 4A and 4B are transmitted through the lines patterned on the main substrate 1 to a connecting terminal 1A at the rear end 80B of the main substrate 1. The electric signals are then transmitted through a flexible line substrate (not shown) connected to the connecting terminal 1A to a circuit of an apparatus (not shown) including this multidirectional controller 100.

The rotational electronic part 3 is manipulated by rotating the control knob 2 in horizontal (circumferential) and vertical directions with respect to the surface of the main substrate 1. When the control knob 2 is pressed in the vertical direction with respect to the surface of the main substrate 1, the portion of the main substrate 1 that is outside of the supporting member 5 bends in the vertical direction with respect to the surface of the main substrate 1.

When the switching button 4C or 4D makes contact with the bumps 5D or 5E, the pushing-type switch 4A or 4B is switched on or off. When the above-described vertical force on the control knob 2 is released, the main substrate 1 returns from the bent position to its neutral position due to its elastic restoring force.

Specifically, the multidirectional controller 100 is manipulated in the vertical directions at the control knob 2 by utilizing the elastic restoring force of the main substrate 1, while it is manipulated in the horizontal directions by rotationally manipulating the control knob 2.

However, the above-described multidirectional controller 100 has the following problems. When the control knob 2 is pressed in the vertical directions with respect to the surface of the main substrate 1, the main substrate 1 bends. This force for bending the main substrate 1 is added to the force required for switching the pushing-type switches 4A or 4B, which results in an insufficient (or a "dull") click feeling upon manipulating the switches. Moreover, since the portion of the main substrate 1 where the pushing-type switches 4A and 4B are provided also bends to a certain degree, the manipulation stroke becomes larger and the switching control therefore becomes unstable.

EXAMPLE 1

Hereinafter, an example of a multidirectional controller 200 according to the first example of the present invention which overcomes the above-described problems will be described with reference to FIGS. 1 through 4.

Figure 2:
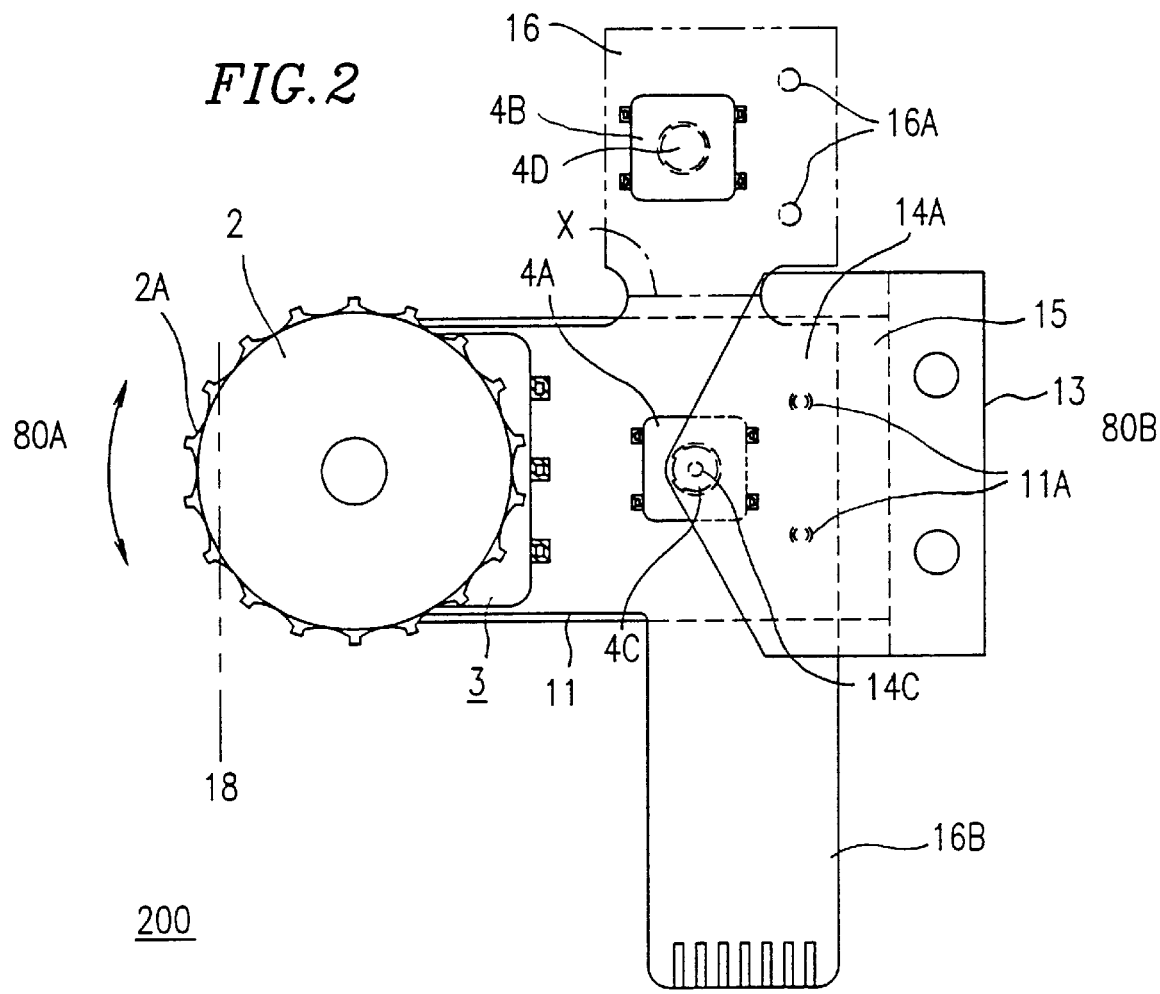
FIG. 2 is a plan view showing the multidirectional controller according to the first example of the present invention.

FIG. 1 is a cross-sectional view showing the multidirectional controller 200 according to the first example of the present invention and FIG. 2 is a plan view showing the multidirectional controller 200. Components having like functions and effects are denoted by the same reference numerals as those in FIGS. 17 and 18, and the description thereof is omitted.

Referring to FIGS. 1 and 2, the multidirectional controller 200 according to the first example of the present invention includes a base substrate 11 having a thin supporting point 15 at a rear end 80B portion of the base substrate 11. The thin supporting point 15 acts as a supporting point for the base substrate 11 to sway without bending. Herein, the term "sway" refers to a movement of a substrate which may bend at a predetermined portion but the remaining major portion of the substrate remains straight to move in vertical directions. The multidirectional controller 200 further includes an encoder 3 (as an electronic part 3) with the rotational disk-shape control knob 2 at a front end 80A portion of the base substrate 11. A supporting member 13 supports the base substrate 11. Switches 4A and 4B function in response to the sway of the base substrate 11.

The supporting member 13 includes opposing supporting portions 14A and 14B. The base substrate 11 is integrated with the supporting member 13 with, for example, a resin.

As shown in FIG. 2, a flexible substrate 16 is folded at line X so as to be laterally aligned with the base substrate 11, and is secured to the substrate 11 by engaging one or more dowels 11A which extend through holes 16A provided through the flexible substrate 16. The flexible substrate 16 has a line pattern formed from a metal foil or the like. The rotational electronic part 3, i.e., the rotation-type encoder 3 has predetermined click adjustments and is soldered to the line pattern of the flexible substrate 16. In this manner, a main substrate 17 (FIG. 1) including the line pattern, the flexible substrate 16 and the base substrate 11 is formed.

The pushing-type switches 4A and 4B are soldered to the line pattern on the flexible substrate 16 in between the encoder 3 and the thin supporting point 15.

The rear end 80B of the base substrate 11 is attached to the supporting member 13 via the thin supporting point 15. The opposing supporting portions 14A and 14B extend from the supporting member 13 toward the front end 80A of the base substrate 11 along the surfaces of the base substrate 11. Bumps 14C and 14D are provided so as to touch the switching buttons 4C and 4D on the switches 4A and 4B, respectively. In FIG. 1, the base substrate 11 is shown to be maintained at a neutral position where neither of the pushing-type switches 4A and 4B are switched by the pressure of the bumps 14C and 14D.

As shown in FIG. 2, the line pattern on the flexible substrate 16 includes an electric signal lead portion 16B for leading the electric signals from the encoder 3 and the switches 4A and 4B to the outside of the multidirectional controller. The electric signal lead portion 16B is provided outwardly sideways from a side of the base substrate 11.

Figure 3:
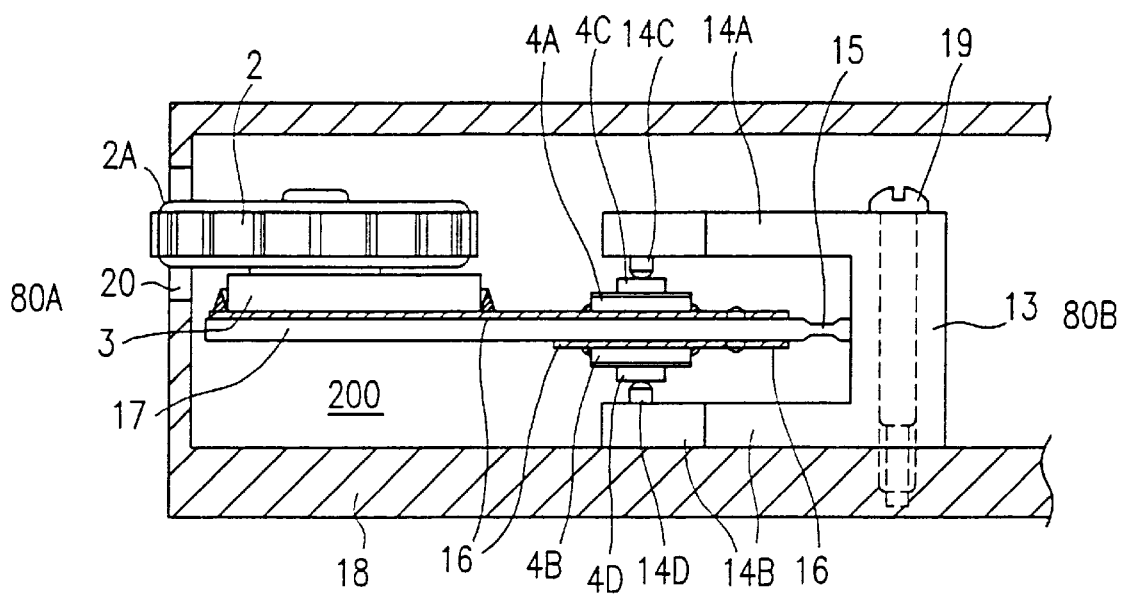
FIG. 3 is a cross-sectional view showing the multidirectional controller according to the first example of the present invention mounted in a multidirectional controlling device.

FIG. 3 is a cross-sectional view showing the multidirectional controller 200 according to the first example of the present invention mounted in a multidirectional controlling device 210.

The multidirectional controller 200 is secured to the multidirectional controlling device (i.e., an electronic apparatus) 210 preferably by a screw 19 such that the bottom surface of the supporting portion 14B is attached to a main case 18 of the multidirectional controlling device 210 and such that a part of the control knob 2 (hereinafter, referred to as "a projecting knob portion 2A") projects through an opening 20 in the main case 18.

Hereinafter, an operation of the multidirectional controller 200 according to the first example of the present invention will be described.

As shown in FIG. 2, when the projecting knob portion 2A is rotated in horizontal directions with respect to the surface of the base substrate 11 as indicated by an arrow, the encoder 3 generates pulse signals corresponding to the rotation direction wherein the control knob 2 rotates in discrete increments (i.e., at predetermined click adjustments). The pulse signals are transmitted to a circuit provided in the electronic apparatus via the electric signal lead portion 16B of the flexible substrate 16.

Once this rotational manipulation is finished, the control knob 2 remains at the predetermined clicking adjustment.

Figure 4:
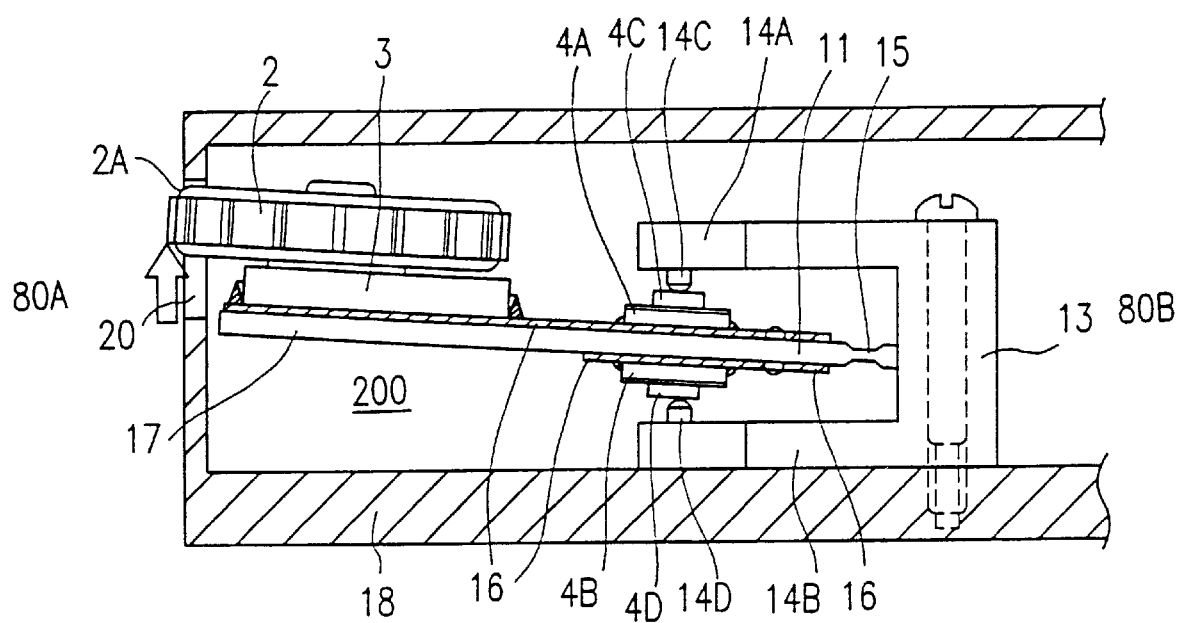
FIG. 4 is a cross-sectional view showing the multidirectional controller according to the first example of the present invention mounted in a multidirectional controlling device, in one operational position.

FIG. 4 is a cross-sectional view showing the multidirectional controller 200 according to the first example of the present invention mounted in the multidirectional controlling device 210, in one operational position.

As shown in FIG. 4, when the projecting knob portion 2A is pressed in an upward direction as indicated by a white arrow, the base substrate 11 upwardly sways via the thin supporting point 15 without bending. As a result, the switching button 4C on the pushing-type switch 4A is pressed by the bump 14C, thereby activating the pushing-type switch 4A. Signals generated by the switching on of the pushing-type switch 4A are transmitted to the circuit of the electronic apparatus via the electric signal lead portion 16B.

When the pressing force in the upward direction is released from the projecting knob portion 2A, the base substrate 11 will return to its neutral position due to its restoring force.

Similarly, when the projecting knob portion 2A is pressed in a downward direction, the base substrate 11 downwardly sways via the thin supporting point 15 without bending. As a result, the switching button 4D on the pushing-type switch 4B is pressed by the bump 14D, thereby activating the pushing-type switch 4B.

While the control knob 2 is being pressed in the vertical directions (either up or down), the control knob 2 is settled at the predetermined click adjustment of the encoder 3. Therefore, the control knob 2 does not rotate in horizontal directions with respect to the base substrate 11 and thus a pulse signal is not generated by the encoder 3.

The restoring force of the pushing-type switches 4A and 4B for maintaining the main substrate 17 (and thus the control knob 2) at the neutral position, and the force required for pressing the switches 4A and 4B, i.e., the force against the restoring forces are preferably large so that the main substrate 17 (and thus the control knob 2) is stable.

According to the first example of the present invention, the base substrate 11 sways in the vertical directions via the thin supporting point 15 without bending for the switching on and off the switch 4A or 4B.

Since a force for bending the base substrate 11 is not required in order to sway the main substrate 17, the control knob 2 is manipulated in the vertical directions with less force compared to a conventional controller. In other words, the slope (rate of change) of the force applied on the control knob 2 relative to the actual manipulating force is larger than in the conventional controller.

According to the first example of the present invention, the multidirectional controller 200 is provided which may be manipulated in horizontal and vertical directions (i.e., in 4 directions) and which has a satisfactory click feeling when the control knob 2 is manipulated in the vertical directions. Moreover, since the base substrate 11 sways without bending, the manipulation stroke is small, thereby stabilizing the controller 200.

The multidirectional controller 200 according to the first example of the present invention is provided with the encoder 3. Alternatively, a rotation-type switch may be used instead of the encoder 3.

Furthermore, the multidirectional controller 200 may be provided with an additional pushing-type switch which, for example, is switched on and off by pushing the control knob 2 at the front end 80A portion of the main substrate 11 toward the rear end 80B of the main substrate 11 as disclosed in Japanese Laid-Open Publication No. 8-203387. In this case, a multidirectional controller is provided which may be manipulated in 5 directions.

Alternatively, a multidirectional controller which is manipulated in 3 directions may be provided by omitting either one of the switches 4A or 4B on the main substrate 17.

It can be appreciated that the same effect may be obtained in the case where the bumps 14C and 14D are provided on the main substrate 17 and where the switches 4A and 4B are provided on the opposing supporting portions 14A and 14B, respectively.

EXAMPLE 2

Hereinafter, a multidirectional controller 300 according to a second example of the present invention will be described with reference to FIGS. 5, 6, 7A and 7B. Components having like functions and effects are denoted by the same reference numerals as those in the previous figures, and the description thereof is omitted.

Figure 5:
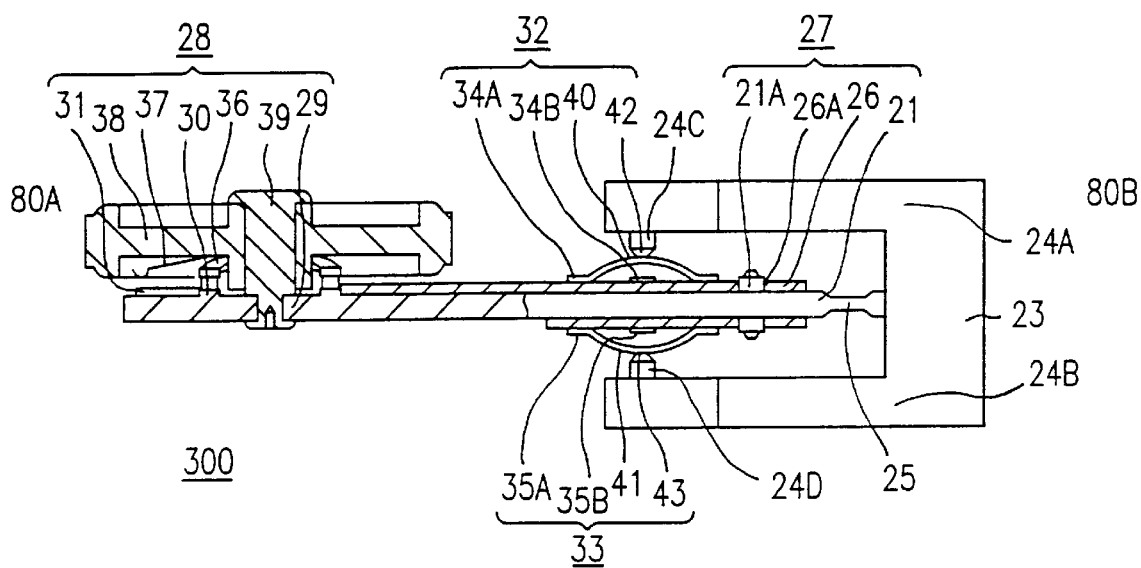
FIG. 5 is a cross-sectional view showing a multidirectional controller according to a second example of the present invention.
Figure 6:
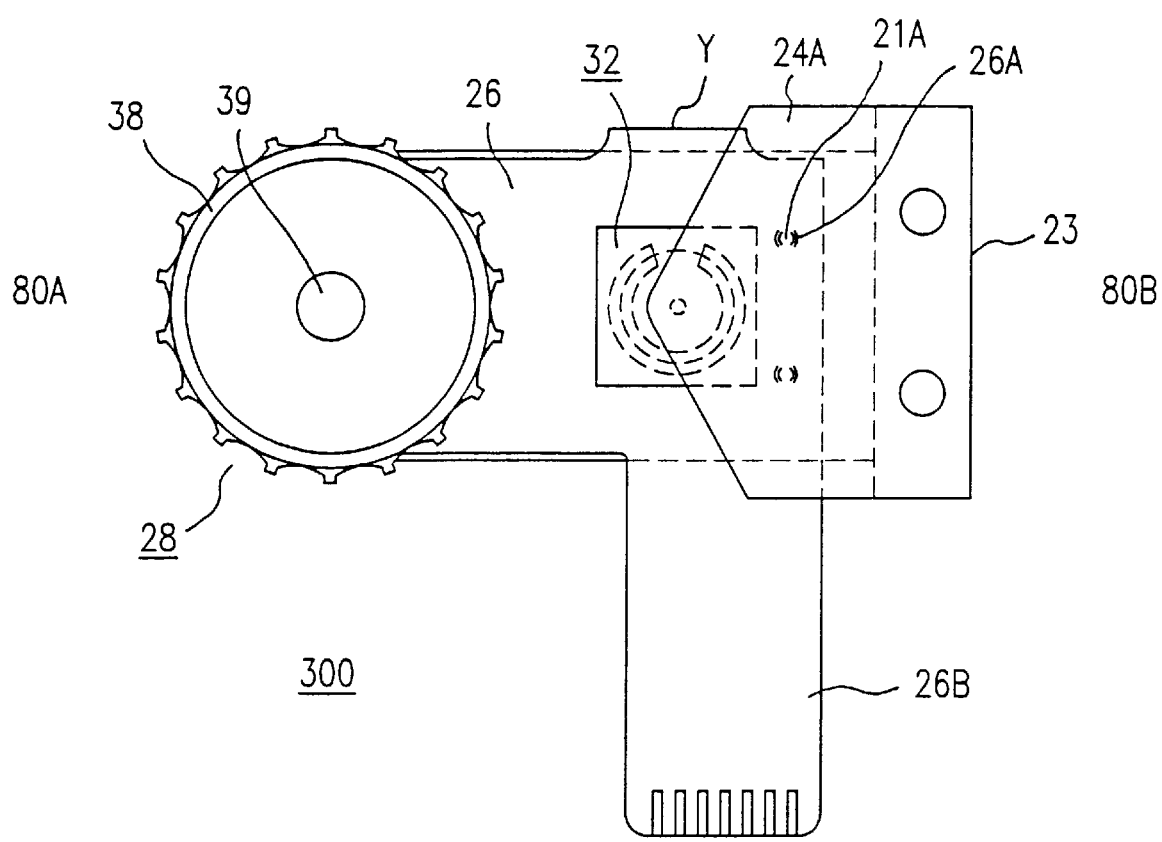
FIG. 6 is a plan view showing the multidirectional controller according to the second example of the present invention.
Figure 7A:
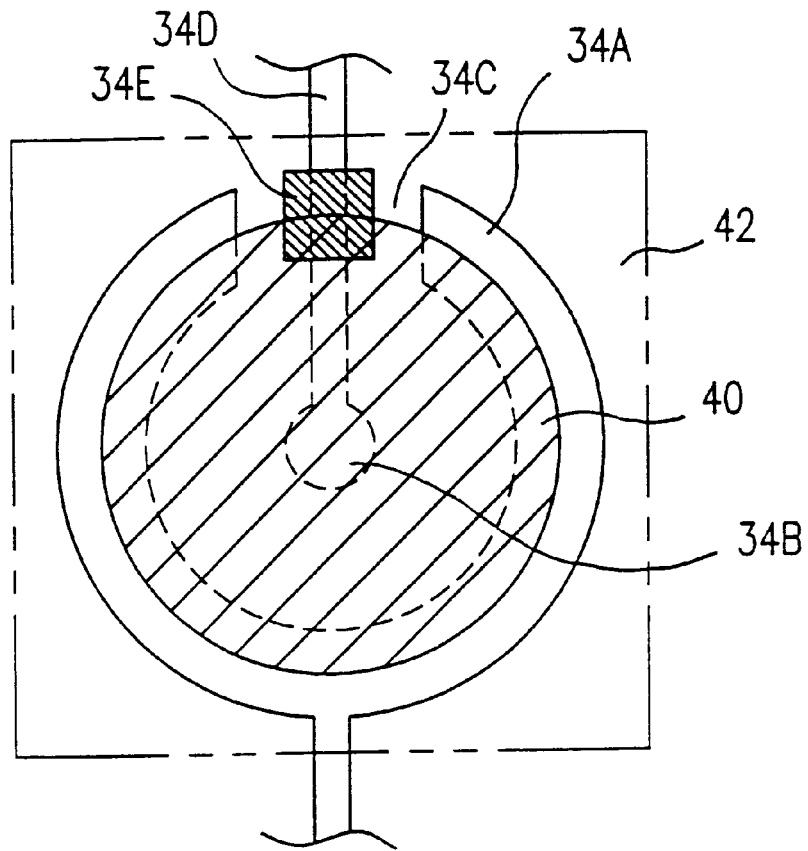
FIG. 7A is a plan view of a pushing-type switch of the multidirectional controller according to the second example of the present invention.
Figure 7B:
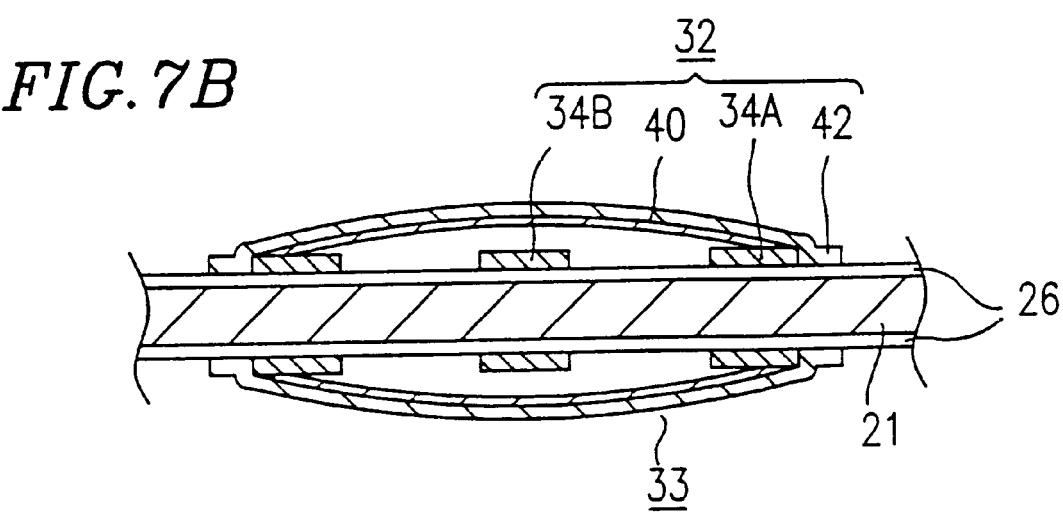
FIG. 7B is a cross-sectional view of the pushing-type switch of the multidirectional controller according to the second example of the present invention.

FIG. 5 is a cross-sectional view showing the multidirectional controller 300 according to the second example of the present invention and FIG. 6 is a plan view showing the multidirectional controller 300. FIG. 7A is an enlarged plan view of a pushing-type switch of the multidirectional controller 300 and FIG. 7B is an enlarged cross-sectional view of the pushing-type switch of the multidirectional controller 300.

Referring to FIGS. 5 and 6, the multidirectional controller 300 according to the second example of the present invention includes a base substrate 21 which sways via a thin supporting point 25 provided at a rear end 80B portion of the base substrate 21 without bending. The controller 300 also includes a control knob 38 which may be manipulated in predetermined directions, an encoder 28 provided at a front end 80A portion of the substrate 21, a supporting member 23 for supporting the base substrate 21 and pushing-type switches 32 and 33. The pushing-type switches 32 and 33 are switched in response to the sway of the base substrate 21.

The multidirectional controller 300 according to the second example of the present invention differs from the multidirectional controller 200 according to the first example of the present invention in the structure of the rotation-type encoder (i.e., the rotational electronic part) 28 which has predetermined click adjustments and in a structure of the two pushing-type switches.

As shown in FIG. 5, the supporting member 23 includes opposing supporting portions 24A and 24B. The base substrate 21 is integrated with the supporting member 23 with a resin.

As shown in FIG. 6, in the same manner as in the first example of the present invention, a single-layer flexible substrate 26 is folded at line Y. The folded flexible substrate 26 is laterally aligned with the base substrate 21, and is secured to the substrate 21 by engaging one or more dowels 21A on the top and the bottom surfaces of the base substrate 21 which extend through holes 26A provided through the flexible substrate 26. The flexible substrate 26 has a line pattern made from a metal foil. In this manner, a main substrate 27 provided with a line pattern, including the flexible substrate 26 and the base substrate 21, is formed.

As shown in FIG. 5, the front end 80A portion of the base substrate 21 is provided with a through hole 29 for the rotation-type encoder 28, and a ring-like portion 30 for the predetermined click adjustments. The through hole 29 and the ring-like portion 30 are concentric.

The line pattern on the base substrate 21 is provided with a radial securing portion 31 (FIG. 5) for the encoder 28. In addition, securing portions 34A, 34B, 35A and 35B are provided on the flexible substrate 26 for securing the pushing-type switches 32 and 33.

On the thus-formed line pattern of the main substrate 27, a spring 36 for the predetermined click adjustments, which elastically makes contact with the ring-like portion 30, and the rotational disk-like control knob 38 are provided. A movable elastic portion 37, which elastically makes contact with the radial securing portion 31, is provided on the bottom surface of the control knob 38. A circular tack 39, which extends through the center hole of the control knob 38, is inserted and caulked in the through hole 29, whereby the control knob 38 is rotatably attached to the base substrate 21. In this manner, the encoder 28 is formed.

Referring to FIGS. 7A and 7B, the securing portions 34A, 34B, 35A and 35B formed on the top and the bottom surfaces of the flexible substrate 26 are covered with movable dome-like contact portions 40 and 41 which are preferably made from deformable metal plates. Insulating films 42 and 43 are adhered on the movable dome-like contact portions 40 and 41, and thereby form the pushing-type switches 32 and 33.

Returning to FIG. 5, bumps 24C and 24D are provided on the ends of the opposing supporting portions 24A and 24B, respectively. The bumps 24C and 24D are positioned so as to touch the pushing-type switches 32 and 33. When forces are not exerted on the control knob 38, the main substrate 27 is maintained at a neutral position where the switches 32 and 33 are not switched by pressure exerted by the bumps 24C and 24D.

As shown in FIGS. 7A and 7B, the ring-like outer securing contact portion 34A (which has a notch 34C) and the center securing contact portion 34B are made from the metal foil used for forming the line pattern. An outer periphery of the movable dome-like contact portion 40 is positioned on the outer securing contact portion 34A.

An insulating film 34E (FIG. 7A) adheres to a lead portion 34D which extends through the notch 34C to the center securing contact portion 34B. The insulating film 34E prevents the outer periphery of the movable dome-like contact portion 40 from making contact with the lead portion 34D. An elastic insulating film 42 is adhered on the top surface of the movable dome-like portion 40. The insulating film 42 secures the movable dome-like contact portion at a prescribed position.

Similarly, the switch 33 provided on the bottom surface of the main substrate 27 has substantially the same structure as the switch 32.

As shown in FIG. 6, in the same manner as in the first example, an electric signal lead portion 26B for leading the electric signals from the encoder 28 and the switches 32 and 33, is formed so as to be integrated with the flexible substrate 26.

The operation of the multidirectional controller 300 according to the second example of the present invention having the above-described structure is substantially the same as that of the multidirectional controller 200 according to the first example of the present invention, and thus the description thereof is omitted.

While the multidirectional controller 300 according to the second example of the present invention has the same effects as those obtained in the multidirectional controller 200 according to the first example of the present invention, it is less expensive and more compact than the multidirectional controller 200 according to the first example of the present invention.

The multidirectional controller 300 according to the second example of the present invention is provided with the encoder 28. Alternatively, a rotation-type switch may be used instead of the encoder 28.

Furthermore, the multidirectional controller 300 may be provided with an additional pushing-type switch which, for example, is switched on and off by pushing the control knob 38 at the front end 80A portion of the main substrate 21 toward the rear end 80B of the main substrate 21 as disclosed in Japanese Laid-Open Publication No. 8-203387. In this case, a multidirectional controller is provided which may be manipulated in 5 directions.

Alternatively, a multidirectional controller which is manipulated in 3 directions may be provided by omitting either one of the switches 32 or 33 on the flexible substrate 26.

EXAMPLE 3

Hereinafter, a multidirectional controller 400 according a third example of the present invention will be described with reference to FIGS. 8 to 10. Components having like functions and effects are denoted by the same reference numerals as those in the previous figures, and the description thereof is omitted.

Figure 8:
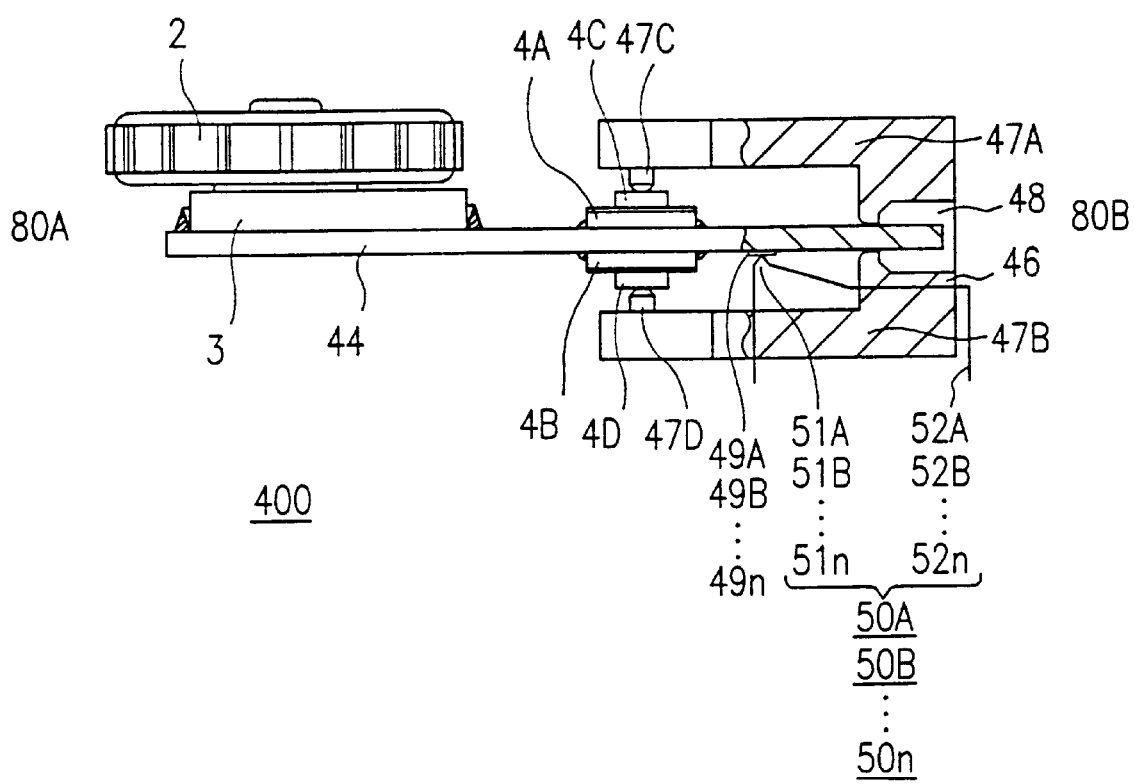
FIG. 8 is a cross-sectional view showing a multidirectional controller according to a third example of the present invention.
Figure 9:
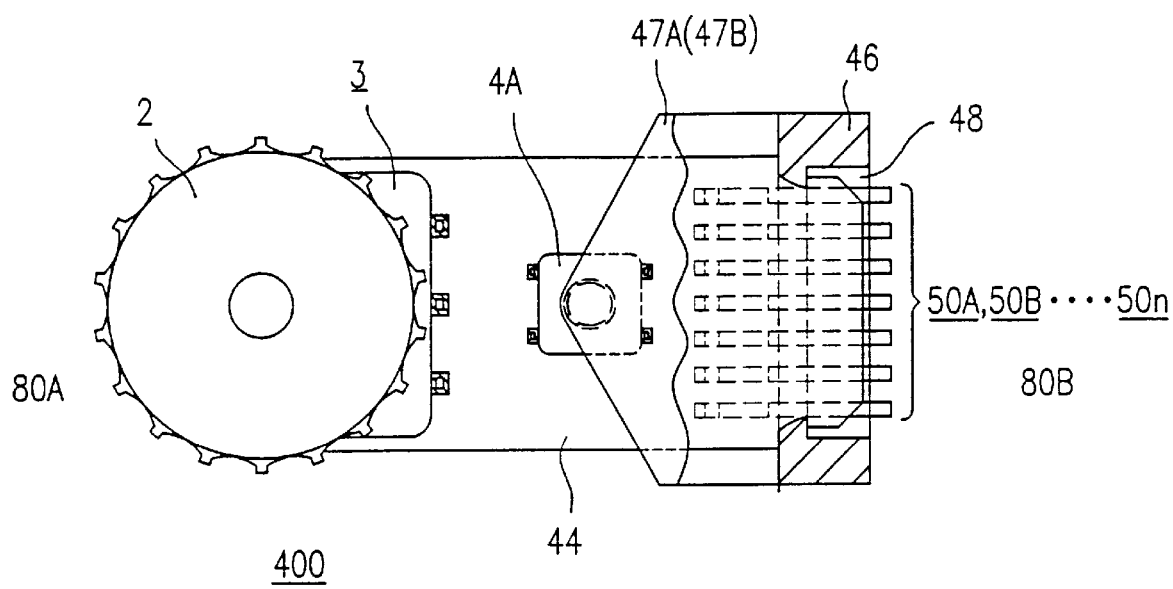
FIG. 9 is a plan view showing the multidirectional controller according to the third example of the present invention.

FIG. 8 is a cross-sectional view showing the multidirectional controller 400 according to the third example of the present invention and FIG. 9 is a plan view showing the multidirectional controller 400.

Referring to FIG. 8, the multidirectional controller 400 according to the third example of the present invention includes a supporting member 46 which has a through hole 48 for inserting a main substrate 44. A portion where the through hole 48 and the main substrate 44 make contact with each other functions as a supporting point. Thus, the main substrate 44 sways via the supporting point without bending.

The multidirectional controller 400 according to the third example of the present invention differs from the multidirectional controller 300 of the second example in that the main substrate 44 is formed and maintained in a different manner.

The main substrate 44 is formed of a rigid insulative substrate having a line pattern made from a metal foil or the like on both the top and bottom surfaces thereof. The supporting member 46 is preferably made of a resin and has opposing supporting portions 47A and 47B, respectively. The supporting member 46 maintains and allows the main substrate 44 to sway without bending.

The encoder 3 with the control knob 2 is soldered to a front end 80A portion of the main substrate 44. Switches 4A and 4B are each soldered to the top and the bottom surfaces of the main substrate 44, respectively. Bumps 47C and 47D are provided at the end portions of the opposing supporting portions 47A and 47B which extend from the supporting member 46. The bumps 47C and 47D are positioned so as to touch the switching buttons 4A and 4B. When forces are not exerted on the control knob 2, the main substrate 44 is maintained at a neutral position where the switches 4A and 4B are not switched by pressure exerted by the bumps 47C and 47D.

Referring to FIGS. 8 and 9, electric signals from the encoder 3 and the switches 4A and 4B are transmitted through the line pattern provided on the main substrate 44 to securing contact portions 49A, 49B . . . 49$n$ which are provided on the bottom surface of a rear end 80B portion of the main substrate 44. Elastic contact portions 50A, 50B . . . 50$n$ which are made of thin deformable metal plates are attached to the supporting member 46 at the rear end 80B portion. Contacting points 51A, 51B . . . 51*n* at the ends of the elastic contact portions 50A, 50B . . . 50*n* elastically make contact with the securing contact portions 49A, 49B . . . 49*n* so as to lead the electric signals through lower parts 52A, 52B . . . 52*n* of the contact portions 50A, 50B . . . 50*n* to the outside of the multidirectional controller 400.

Figure 10:
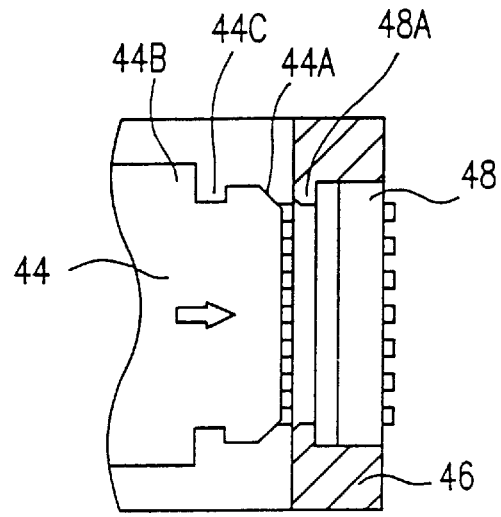
FIG. 10 is a partial plan view illustrating a joint between a main substrate and a supporting member of the multidirectional controller according to the third example of the present invention.

FIG. 10 is a partial plan view for illustrating a joint structure between the main substrate 44 and the supporting member 46 of the multidirectional controller 400 according to the third example of the present invention.

The main substrate 44 is inserted into the through hole 48 provided in the supporting member 46 as follows. The rear end 80B portion of the main substrate 44 is provided with a tapered portion 44A. As shown in FIG. 10, the tapered portion 44A is forcibly inserted into a smaller opening 48A (as indicated with a white arrow) which has a smaller diameter than that of the through hole 48. The main substrate 44 is inserted into the opening 48A until a wall 44B makes contact with the supporting member 46. As a result, the smaller hole 48A engages with a detent 44C and the main substrate 44 is joined with the supporting member 46.

Accordingly, the main substrate 44 does not move in horizontal directions with respect to the surface of the main substrate 44. As shown in FIG. 8, since the through hole 48 has a larger diameter at the rear end 80B portion of the main substrate 44, the main substrate 44 is maintained such that it sways in vertical directions with respect to the main substrate 44 without bending.

The operation of the multidirectional controller 400 according to the third example of the present invention is substantially the same as that of the multidirectional controller 300 according to the second example of the present invention, and thus the description thereof is omitted.

While the multidirectional controller 400 according to the third example of the present invention, has the same effects as those obtained in the multidirectional controller 200 according to the first example of the present invention, it is easier to form the multidirectional controller 400 which may be manipulated in 4 directions by using commercially available electronic parts than the multidirectional controller 200. Furthermore, electric signals may be transmitted directly to the line substrate of the electronic apparatus via the elastic contact portion of the supporting member. Moreover, the multidirectional controller 400 is durable against numerous manipulations in vertical directions.

The switches 4A and 4B may be formed of movable dome-like contact portions such as those in the second example of the present invention, so that the multidirectional controller 400 may be made less expensive and more compact.

The multidirectional controller 400 according to the third example of the present invention is provided with the encoder 3. Alternatively, a rotation-type switch may be used instead of the encoder 3.

Furthermore, the multidirectional controller 400 may be provided with an additional pushing-type switch which, for example, is switched on and off by pushing the control knob 2 at the front end 80A portion of the main substrate 44 toward the rear end 80B of the main substrate 44 as disclosed in Japanese Laid-Open Publication No. 8-203387. In this case, a multidirectional controller is provided which may be manipulated in 5 directions.

Alternatively, a multidirectional controller which is manipulated in 3 directions may be provided by omitting either one of the switches 4A and 4B on the main substrate 44.

It can be appreciated that the same effect may be obtained in the case where the bumps 47C and 47D are provided on the main substrate 44 and where the switches 4A and 4B are provided on the opposing supporting portions 47A and 47B.

EXAMPLE 4

Hereinafter, a multidirectional controller 500 according to a fourth example of the present invention will be described with reference to FIGS. 11 through 13. Components having like functions and effects are denoted by the same reference numerals as those in the previous figures, and the description thereof is omitted.

Figure 11:
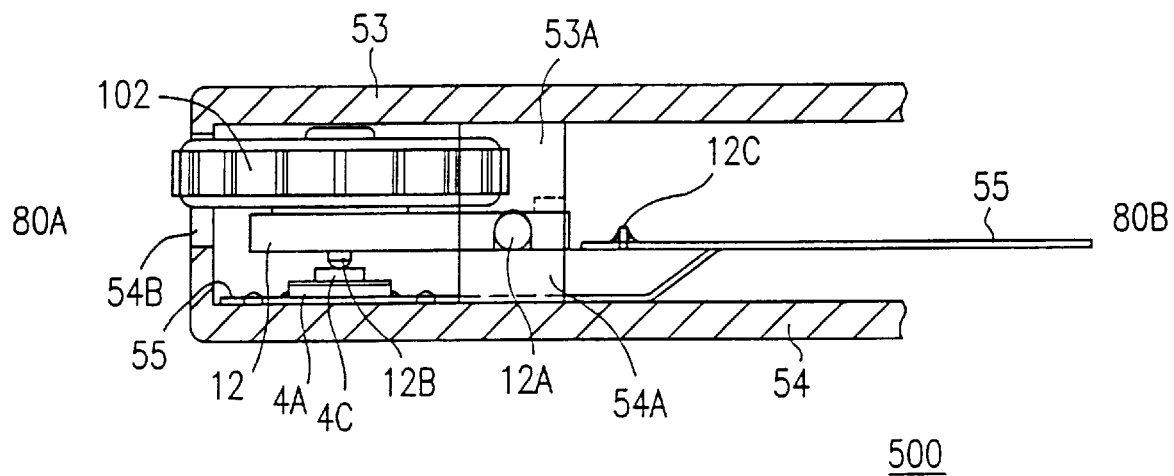
FIG. 11 is a cross-sectional view showing a multidirectional controller according to a fourth example of the present invention.

FIG. 11 is a cross-sectional view of the multidirectional controller 500 according to the fourth example of the present invention. FIG. 12 is a plan view of the multidirectional controller 500. FIG. 13 is an exploded perspective view of the multidirectional controller 500.

Figure 12:
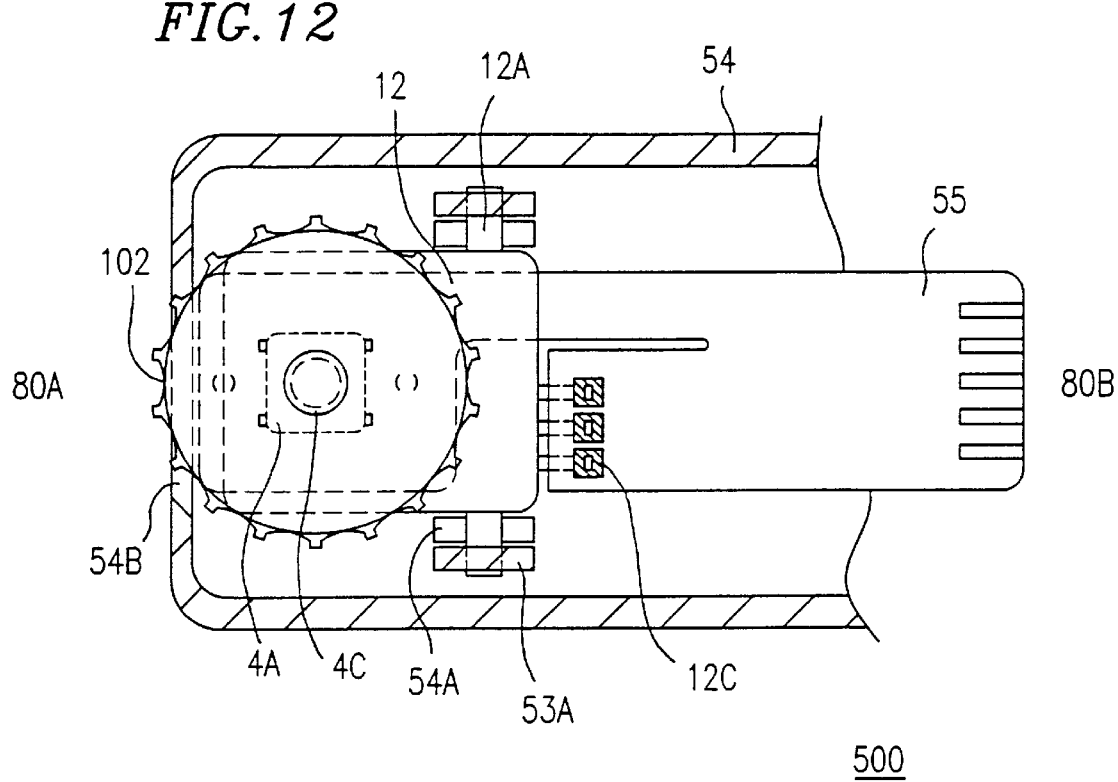
FIG. 12 is a plan view showing the multidirectional controller according to the fourth example of the present invention.
Figure 13:
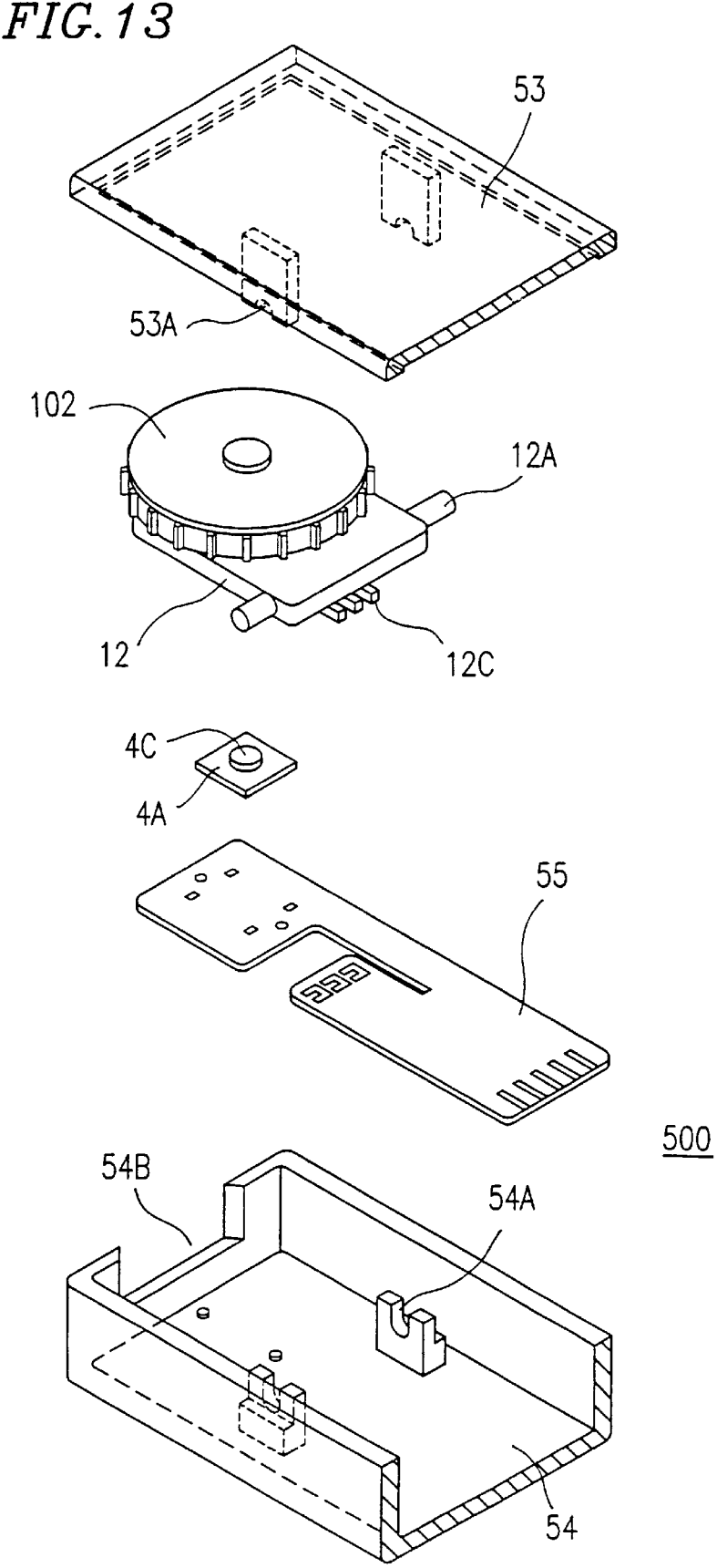
FIG. 13 is an exploded perspective view showing the multidirectional controller according to the fourth example of the present invention.

Referring to FIGS. 11 through 13, the multidirectional controller 500 according to the fourth example of the present invention includes a main substrate 12. The main substrate 12 has a sway shaft 12A. A supporting member includes an upper supporting portion 53 and a lower supporting portion 54 which support the main substrate 12 such that the main substrate 12 is swayable substantially about the sway shaft 12A. Accordingly, the main substrate 12 sways substantially about the sway shaft 12A without bending.

The multidirectional controller 500 according to the fourth example of the present invention includes a switch 4A which is provided on an opposite side of the main substrate 12 with respect to an encoder.

An electronic part 102 including the encoder and a control knob is attached to the main substrate 12. The sway shaft 12A is provided at a rear end 80B portion of the main substrate 12. The sway shaft 12A is rotatably attached to the supporting member by being supported by sway shaft supporting portions 53A and 54A of the upper and lower supporting portions 53 and 54, respectively.

The electronic part 102 is assembled with the main substrate 12 such that a part of the control knob projects out from an opening made by the upper supporting portion 53 and a notch 54B of the lower supporting portion 54.

As shown in FIG. 11, the switch 4A is provided on a flexible substrate 55 under the main substrate 12. The switching button 4C provided on the switch 4A makes contact with a bump 12B provided on the bottom surface of the main substrate 12. The switching button 4C upwardly maintains the main substrate 12 by its restoring force. In FIG. 11, the switch 4A is switched off.

As shown in FIGS. 11 through 13, the flexible substrate 55 is connected to a plurality of terminals 12C which are provided in the main substrate 12 and to the switch 4A. The flexible substrate 55 leads signals output from the encoder and the switch 4A to the outside of the multidirectional controller 500.

The operation of the multidirectional controller 500 according to the fourth example of the present invention having the above-described structure is substantially the same as that of the multidirectional controller 200 according to the first example of the present invention, and thus the description thereof is omitted.

Thus, according to the fourth example of the present invention, the multidirectional controller 500 is provided which has a satisfactory click feeling in manipulating the control knob in vertical directions with respect to the main substrate 12. In addition, the controller 500 also has a stable manipulation stroke and has durable characteristics against numerous manipulations in the vertical directions.

The switch 4A may be formed of movable dome-like contact portions such as those in the second example of the present invention, so that the multidirectional controller 500 may be made less expensive and more compact.

The controller 500 according to the fourth example of the present invention is provided with the encoder. Alternatively, a rotation-type switch may be used instead of the encoder.

Furthermore, the multidirectional controller 500 may be provided with an additional pushing-type switch which, for example, is switched on and off by pushing the control knob at the front end 80A portion of the main substrate 12 toward the rear end 80B as disclosed in Japanese Laid-Open Publication No. 8-203387. In this case, a multidirectional controller is provided which may be manipulated in 5 directions.

EXAMPLE 5

Hereinafter, a multidirectional controller 600 according to a fifth example of the present invention will be described with reference to FIGS. 14 through 16. Components having like functions and effects are denoted by the same reference numerals as those in the previous figures, and the description thereof is omitted.

Figure 14:
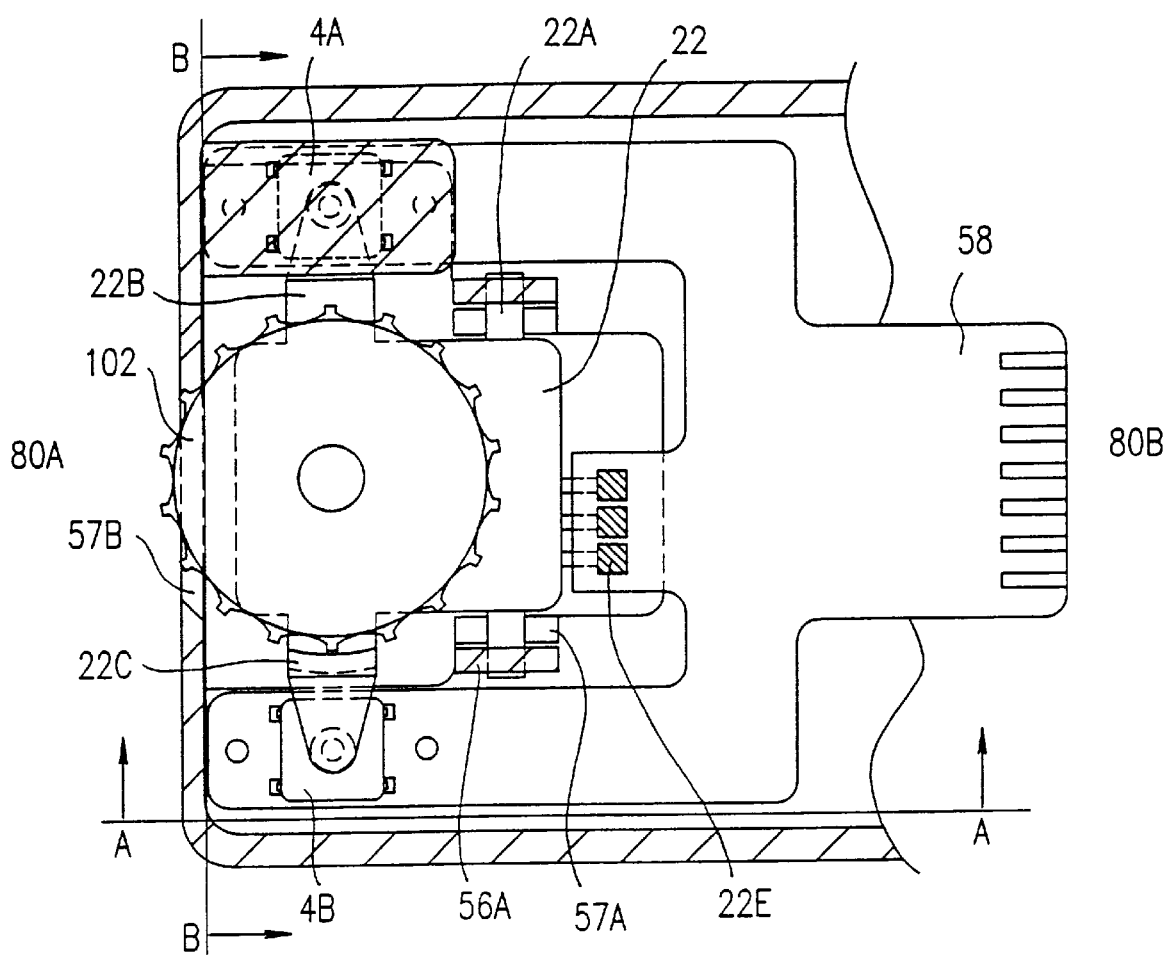
FIG. 14 is a plan view showing a multidirectional controller according to a fifth example of the present invention.

FIG. 14 is a plan view showing the multidirectional controller 600 according to the fifth example of the present invention. FIG. 15 is a side cross-sectional view of the multidirectional controller 600 taken along line A—A of FIG. 14 and FIG. 16 is a front cross-sectional view of the multidirectional controller 600 taken along line B—B of FIG. 14.

Figure 15:
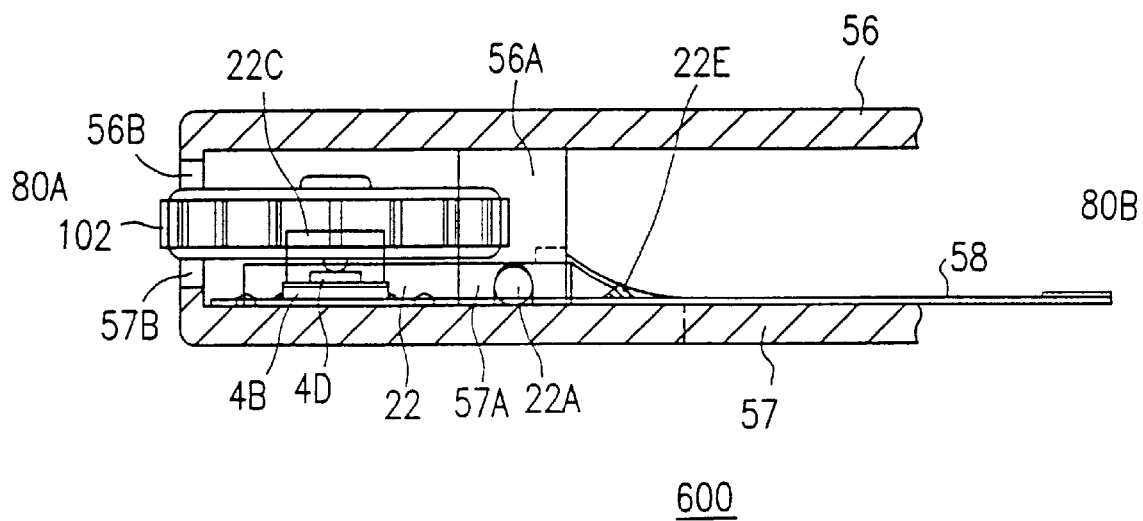
FIG. 15 is a side cross-sectional view of the multidirectional controller according to the fifth example of the present invention taken along line A—A of FIG. 14.
Figure 16:
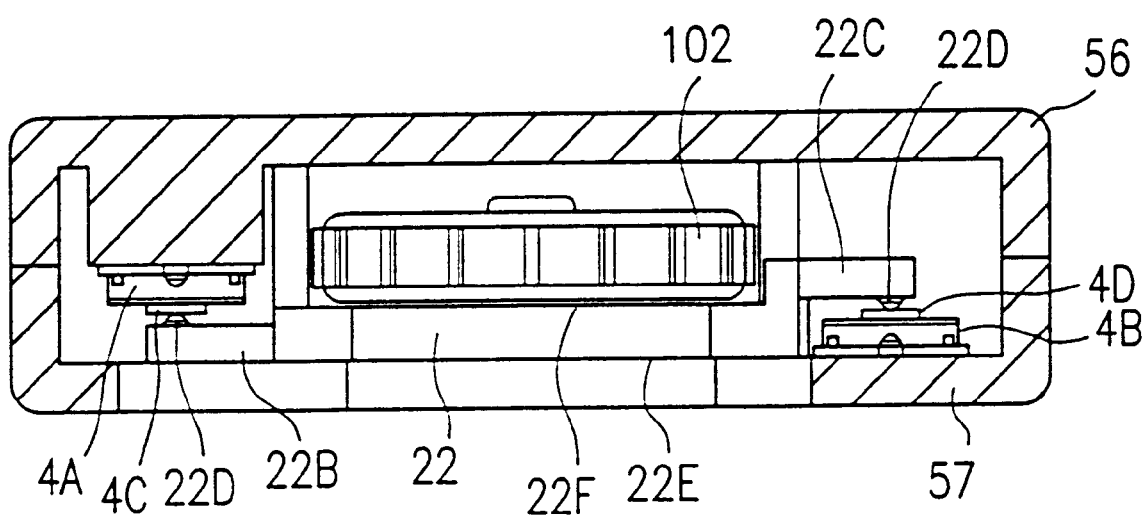
FIG. 16 is a front cross-sectional view of the multidirectional controller according to the fifth example of the present invention taken along line B—B of FIG. 14.

Referring to FIGS. 14 through 16, the multidirectional controller 600 according to the fifth example of the present invention includes the main substrate 22. The main substrate 22 is provided with the sway shaft 22A. As shown in FIGS. 15 and 16, a supporting member includes an upper supporting portion 56 and a lower supporting portion 57 which support the main substrate 22 such that the main substrate 22 is swayable substantially about the sway shaft 22A. Accordingly, the main substrate 22 sways substantially about the sway shaft 22 without bending.

The multidirectional controller 600 differs from the multidirectional controller 500 according to the fourth example of the present invention in that arm-like switching portions 22B and 22C are provided as illustrated in FIG. 14. Switches 4A and 4B are provided at positions corresponding to the switching portions 22B and 22C, respectively.

An electronic part 102 including an encoder and a control knob is attached to the main substrate 22. The sway shaft 22A is provided at a rear end 80B portion of the main substrate 22. The sway shaft 22A is rotatably attached to the supporting member by being supported by sway shaft supporting portions 56A and 57A of the upper and lower supporting portions 56 and 57, respectively.

The electronic part 102 is assembled with the main substrate 22 such that a part of the control knob projects out from an opening made by notches 56B and 57B of the upper and lower supporting portions 56 and 57.

As shown in FIG. 16, bumps 22D are provided on the top surface of the switching portion 22B and on the bottom surface of the switching portion 22C, respectively. The switches 4A and 4B are provided such that the bumps 22D make contact with the switching buttons 4C and 4D, respectively. When forces are not exerted on the control knob 2, the main substrate 22 is maintained at a neutral position by the restoring force of the switching buttons 4C and 4D of the switches 4A and 4B. In FIGS. 14 through 16, the switches 4A and 4B are switched off.

As shown in FIG. 16, the switching portion 22C and the main substrate 22 are formed at different levels such that the switch 4B is provided on a position higher than the bottom surface 22E of the main substrate 22. Accordingly, the height of the multidirectional controller 600 is minimized compared to the case where the switch 4B is formed below the bottom surface 22E of the substrate 22.

Similarly, the switching portion 22B and the main substrate 22 are formed at different levels such that the switch 4A may be provided at a position lower than a top surface 22F of the main substrate 22.

As shown in FIGS. 14 and 15, the flexible substrate 58 is connected to terminals 22E provided in the main substrate 22 and to the switches 4A and 4B. The flexible substrate 58 leads the signals which are output from the encoder and the signals which are output from the switches 4A and 4B to the outside of the multidirectional controller 600.

The operation of the multidirectional controller 600 according to the fifth example of the present invention having the above-described structure is substantially the same as that of the multidirectional controller 200 according to the first example of the present invention, and thus the description thereof is omitted.

While the multidirectional controller 600 according to the fifth example of the present invention has substantially the same effects as those obtained in the multidirectional controller 500 according to the fourth example of the present invention, the height of the multidirectional controller 600 including the switches 4A and 4B is minimized compared to the multidirectional controller 500.

The switches 4A and 4B may be provided on the main substrate 22 while the bumps 22D may be provided on the upper supporting portion 56 and the lower supporting portion 57, respectively. Alternatively, one of the switches 4A and 4B may be omitted.

The switches 4A and 4B may be formed of movable dome-like contact portions such as those disclosed in the second example of the present invention, so that the multidirectional controller 600 may be made less expensive and more compact.

The controller 600 according to the fifth example of the present invention is provided with the encoder. Alternatively, a rotation-type switch may be used instead of the encoder.

Furthermore, a multidirectional controller 600 may be provided with an additional pushing-type switch which, for example, is switched on and off by pushing the control knob at the front end 80A portion of the main substrate 22 toward the rear end 80B of the main substrate 22 as disclosed in Japanese Laid-Open Publication No. 8-203387. In this case, a multidirectional controller is provided which may be manipulated in 5 directions.

Thus, according to the present invention, a multidirectional controller and a multidirectional controlling device using the multidirectional controller are provided, where the multidirectional controller has a satisfactory click feeling in manipulating a control knob in vertical directions and a stable manipulation stroke. Furthermore, the present invention also provides a multidirectional controller and a multidirectional controlling device using the multidirectional controller, where the multidirectional controller is durable against numerous manipulations.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multidirectional controller, comprising:

a substrate having a first end portion and a second end portion, which sways without bending via a supporting point provided at the first end portion;

an electronic part attached at the second end portion, which includes a control portion which is manipulated in a predetermined direction wherein the electronic part causes the substrate to sway without bending when the electronic part is manipulated;

a supporting member for supporting the substrate; and a switch provided so as to be switched in response to the sway of the substrate, when the electronic part is manipulated in the predetermined direction.

2. A multidirectional controller according to claim 1, wherein the substrate has a thin portion which functions as the supporting point.

3. A multidirectional controller according to claim 1, wherein the substrate and the supporting member are integrally formed by a resin molding.

4. A multidirectional controller according to claim 1, wherein:

the substrate comprises a top surface and a bottom surface and the switch is provided on at least one of the surfaces of the substrate;

the supporting member includes opposing supporting portions which are provided so as to sandwich the surfaces of the substrate therebetween; and at least one of the opposing supporting portions has a pressing portion for pressing the switch in response to the sway of the substrate in a direction toward at least one of the surfaces of the substrate.

5. A multidirectional controller according to claim 4, wherein the substrate includes an insulative flexible substrate portion and the flexible substrate portion is provided with a line pattern, and wherein the flexible substrate portion is adhered to at least one of the surfaces of the substrate.

6. A multidirectional controller according to claim 5, wherein:

the line pattern includes an electric signal lead portion for leading electric signals from the electronic part and outputting electric signals from the switch to elements which are outside of the multidirectional controller; and the electric signal lead portion is provided at a position extending in sideways from the top surface or bottom surface of the substrate.

7. A multidirectional controller according to claim 5, wherein the electronic part and the switch are provided on the line pattern.

8. A multidirectional controller according to claim 5, wherein:

the control portion has a movable contact portion which makes contact with a first securing contact portion which is provided on the flexible substrate; and the switch includes a movable dome-like contact portion made from an deformable metal thin plate on a second securing contact portion which is provided on the flexible substrate portion.

9. A multidirectional controller according to claim 1, wherein:

the substrate includes a pressing portion for pressing the switch; and the pressing portion is on at least one of the surfaces of the substrate.

10. A multidirectional controller according to claim 1, further comprising a joint between the substrate and the supporting member, wherein at least a part of the joint functions as the supporting point.

11. A multidirectional controller according to claim 1, wherein the supporting member has an opening for inserting the substrate into the supporting member and wherein a portion where the opening and the substrate make contact with each other functions as the supporting point.

12. A multidirectional controller according to claim 1, wherein the substrate includes a sway shaft and the supporting member supports the substrate such that the substrate is swayable substantially about the sway shaft.

13. A multidirectional controller according to claim 1, wherein:

the switch is provided on at least one of a position lower than the top surface of the substrate and a position higher than the bottom surface of the substrate;

the substrate includes a pressing portion for pressing the switch; and the pressing portion is provided at a different level from a level of the substrate and is provided at a position extending sideways from the substrate.

14. A multidirectional controller according to claim 1, wherein the substrate is an insulative substrate and the substrate includes a line pattern.

15. A multidirectional controller according to claim 14, wherein:

a first securing contact portion is formed on the line pattern;

the supporting member includes an elastic contact portion which deformably makes contact with the first securing contact portion; and the elastic contact portion transmits electric signals from the electronic part and electric signals from the switch to elements which are outside of the multidirectional controller.

16. A multidirectional controller according to claim 14, wherein:

the switch includes a movable dome-like contact portion which is made from a deformable metal thin plate;

a first securing contact portion is formed on the line pattern; and the movable dome-like contact portion is on the first securing contact portion.

17. A multidirectional controller according to claim 1, wherein the electronic part includes a rotation-type or a sliding-type encoder.

18. A multidirectional controller according to claim 1, wherein the electronic part includes a rotation-type or a sliding-type switch.

19. A multidirectional controller according to claim 1, wherein the electronic part includes a click adjustment at a predetermined position.

20. A multidirectional controller according to claim 1, wherein the control portion further comprises a switch which is switched when the control portion is pressed toward the supporting point.

21. A multidirectional controlling device including a multidirectional controller, the multidirectional controller comprising:

a substrate having a first end portion and a second end portion, which sways without bending via a supporting point provided at the first end portion;

an electronic part attached at the second end portion, which includes a control portion which is manipulated in a predetermined direction wherein the electronic part causes the substrate to sway without bending when the electronic part is manipulated;

a supporting member for supporting the substrate; and a switch provided so as to be switched in response to the sway of the substrate, when the electronic part is manipulated in the predetermined direction, wherein the multidirectional controller is mounted in a main body of the multidirectional controlling device such that a part of the control portion projects out from the main body.

22. A multidirectional controlling device according to claim 21, wherein a predetermined operation is executed or halted by manipulating the control portion in a predetermined direction.

* * * * *